Patented Apr. 9, 1929.

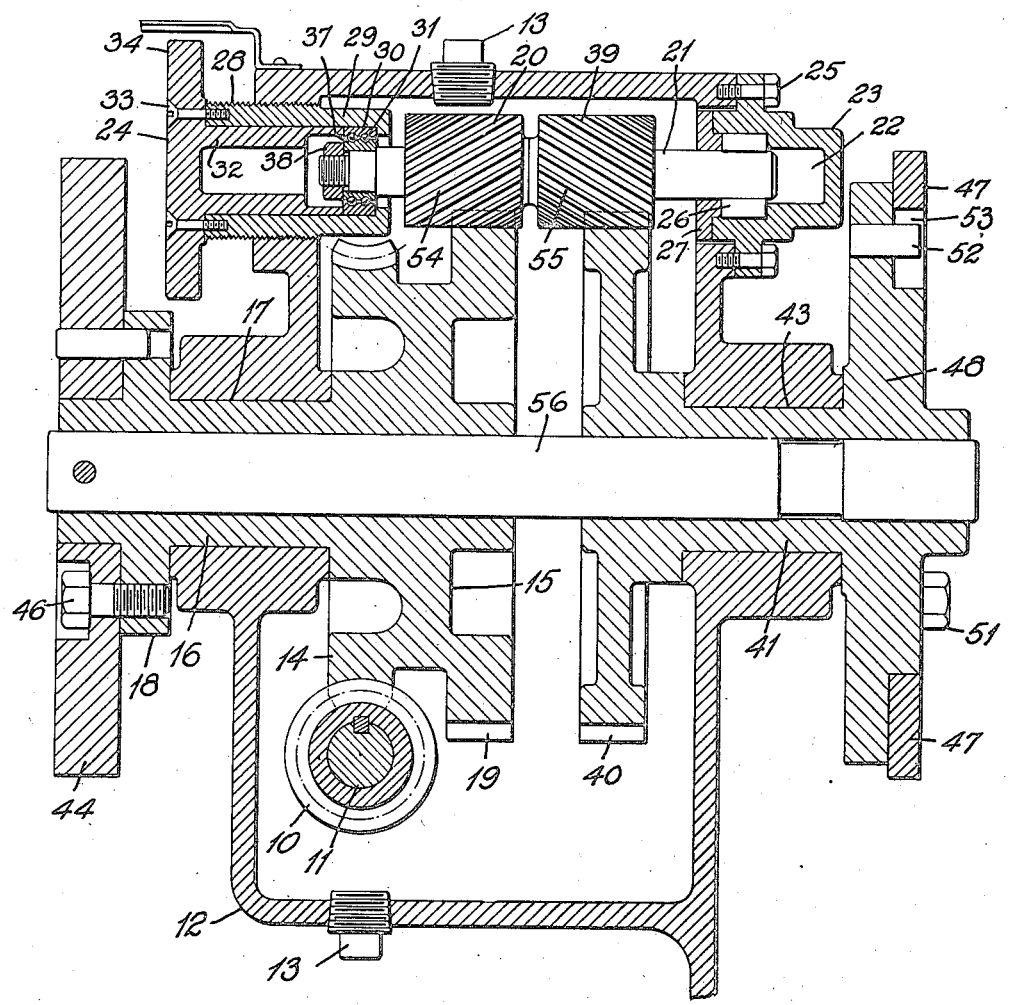

1,708,022

UNITED STATES PATENT OFFICE.

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE.

HELICAL DIFFERENTIAL.

Application filed March 21, 1925. Serial No. 17,246.

My invention relates to power-transmitting mechanism, and it has particular relation to a device for changing, while the mechanism is in operation, the phase relation of operatively associated devices driven from a common source of power.

The primary object of my invention is to provide a phase-changing apparatus for changing the angular relation of members rotating in unison, and this object is accomplished by utilizing helical gears which have the inherent quality of producing relative rotation when one is moved transversely of the other. This relative rotation of the gears produces a change in the angular relation thereof, which may be utilized to advantage in timing the operations of two members operatively connected by the gears.

A phase-changing device of the character designated may be readily adapted for use in connection with a glass feeding machine of the gob-feeding type in which molten glass is discharged periodically, by means of a plunger, through an outlet in the bottom of a glass container, a mold charge being severed from each mass of glass suspended from said outlet and being then delivered to a glass shaping machine. Such a glass feeder is shown and described in the copending application of Karl E. Peiler, Serial No. 683,576, filed December 31, 1923.

In this type of machine it is desirable to vary the timed relation between the expulsive impulse of the plunger and the moment of severing the molten glass issuing from the orifice of the glass container as a result of such impulse, so as to obtain mold charges of different weights and shapes in accordance with the type of parisons being produced.

Another object of this invention, as applied to glass feeders of the kind indicated above, is to provide a sturdy and compact device for changing the phase relation of the plunger and the severing means, which accomplishes this function without interrupting the operation of either of these means and in a highly efficient manner, and in which the friction and wearing stresses shall be reduced to a minimum.

In the illustrated embodiment of my invention, axially alined plunger and shear cams are driven by two alined helical gears, one rigidly secured to a central shaft, and the other loosely mounted thereon, these gears having their teeth cut in opposite directions, and the gears being connected for simultaneous rotation in the same direction, by means of two helical pinions each meshing with one of the helical gears and rigidly connected together. By shifting these pinions endwise, a relative angular displacement is produced between the helical gears, and, consequently, between the plunger cam and the shear cam, by reason of the helix angle of the helical gears and pinions.

Since an angular change of the intermeshing helical gears is produced by a relative transverse movement thereof, the members operated by the gears may be arranged in any convenient manner to obtain the desired phase-changing operation.

The single figure of the accompanying drawing is a longitudinal sectional view taken axially through a device constructed in accordance with my invention.

Referring to the drawing, a substantially oil tight housing 12 contains a phase-changing mechanism for operating the cams of a glass feeder which may be driven from any convenient source of power indicated by a driving worm 10 keyed to a shaft 11 which is mounted in suitable bearings carried by the housing. Convenient openings are provided in the top of the housing 12 for filling and at the bottom for withdrawing lubricant, and these openings are normally closed by plugs 13.

As shown, the worm 10 drives a worm gear 14 mounted on an annular member 15 which also carries a helical gear 19 formed integral therewith. The member 15 is also provided with an extended hub portion 16 which supports the gears 14 and 19 in a bearing 17 provided in the housing 12. The extension 16 is provided with an external flange 18 which abuts the bearing 17 and prevents any axial movement of the gears 14 and 19. This flange also forms a convenient support for an operating cam 44 secured thereto by suitable screws 46.

The helical gear 19 drives an axially aligned helical gear 40 by means of alligned intermediate helical pinions 20 and 39 respectively. The helical gear 40 is provided with an extended hub 41 journaled in a bearing 43 provided in the housing 12. The gear 40 is held from axial displacement by shoulders formed on the helical gear 40 and on an external head 48 carried by the hub 41. The pinion coupling gears 20 and 39 are rigidly mounted on a shaft 21 which is longitudinally movable in its bearings, thus providing for shifting the pinion gears transversely of the main gears.

The pinion shaft 21 is mounted for rotation and axial adjustment in roller bearing and ball bearing structures 23 and 24 respectively. The roller-bearing structure 23 is secured to the right-hand side of the housing 12 by screws 25 and is supplied with suitably mounted roller-elements 26 that are held within the structure 23 by a cap 27. A recess 22 is provided in the roller-bearing structure 23 to allow axial adjustment of the shaft 21 therein.

The ball bearing structure 24 at the left hand side of the housing includes ball elements 31 secured between retainer elements 30 and 37 which are arranged to also serve as thrust elements. The inner retainer 37 is rigidly secured to the shaft 21 by a nut 38 and the outer retainer 30 is clamped to a tubular bearing member 29 by means of a cooperating internal member 32 which is secured to the tubular member by screws 33.

The tubular member 29 is provided with an external threaded portion 28 which engages complementary threads in the housing, and the bearing structure as an entirety may be rotated by a hand wheel 34 to cause an axial movement of the shaft and the pinions carried thereby.

The helical pinion 39 is also mounted on, and preferably formed integral with, the shaft 21 and drives the helical gear 40 in unison with the helical gear 19 and in the same direction.

To assist in maintaining the alignment of the several parts, a shaft 56 extends through the helical gears 19 and 40, the hubs 16 and 41 and the cam-carrying heads 18 and 48. The gear member 15, with its associated helical gear 19, hub 16 and head 18, is secured to the shaft 56, while the helical gear 40, with its hub 41 and head 48, is loosely mounted thereon. From this construction it will be obvious that the shaft 56 rotates in the same direction as the helical gears and the cams driven thereby, and at the same speed. The helical gear 40, however, is free to turn upon the shaft 56 when the angular relation of the helical gears 19 and 40 is to be changed.

Referring to the left-hand side of the housing 12, a cam 44 is disposed without the housing 12 and is rotated with an unchanging relationship to the driving worm 10. It is, therefore, constantly in perfect cyclic unison with any mechanism which it operates, such, for example, as the shears of a glass feeder of the kind mentioned above.

Referring to the right-hand side of the housing 12, there is shown a cam 47, secured to the head 48 and fastened thereto by screws 51 so as to permit substitution by a cam of different contour if desired. A pin 52 may be fastened to the head 48 and may project into a radial slot 53 in the cam 47 to prevent angular displacement of this cam relative to the head 48.

The teeth 54 formed on the helical pinion 20 are cut in a helical path and lead in one direction while the teeth 55 in the pinion 39 are cut in a helical path of corresponding lead but in an opposite direction. As the teeth 54 are moved axially across the teeth of the relatively fixed helical gear 19, a rotary movement is imparted to the helical pinion 20 and likewise to the shaft 21 and to the helical pinion 39 carried thereon, thus imparting a considerable rotary motion to the helical gear 40 and its operating cam 47 connected thereto.

In the normal operation of the device described above, the cams 44 and 47 are driven in unison, and in the same direction. When it is desired to change the angular relation between these cams, the hand wheel 34 is turned, thus imparting endwise movement to both of the helical pinions 20 and 39. Due to the helix angle of the helical gear teeth, such endwise movement of the pinions causes a change in the angular relation between the helical gears 19 and 40, thereby changing the period at which the cam 47, engages its operating element. It will be noted that the angular displacement between the gears 19 and 40 caused by the endwise adjustment of the helical pinions is twice as great as the angle through which the pinions themselves are rotated, because the two pinions, when moved endwise, rotate their respective helical gears equally and in opposite directions.

By substituting other helical pinions and gears having other helix angles, various degrees of relative displacement may be obtained, so that a fine or coarse adjustment may be provided as required.

I have shown and described a specific embodiment of my invention and the useful phase-changing results obtained from the inherent qualities of helical gears, when one is moved transversely of the other, and it is obvious that the invention may be utilized in changing the angular relation of rotating members in various types of mechanism.

In one type of phase-changing mechanism which is extensively used in glass-feeding machines, a plunger-operating cam and a shear-operating cam are mounted coaxially, one on a hollow shaft and the other on another shaft extending through the hollow shaft. The two shafts are connected by bevel gearing in the nature of a differential drive, one bevel gear being secured to each of the telescoped shafts, and the bevel gears being connected by a bevel pinion meshing with both of the gears. The phase relation of the cams is changed by rotating one of the cams with respect to the other. Such an arrangement, while effective, has the disadvantage that the shafts and bearings are subjected to a considerable and unequal wear, by reason of the fact that the shafts rotate one within the other and in opposite directions or at different speeds, and also by reason of the unequal stresses upon the shaft bearings which are incident to that construction.

According to the specific embodiment of my present invention described above, I provide a phase-changing gearing in which the objections mentioned above are avoided by mounting the cams and their driving gears on a single shaft, and by causing the shaft and the driving gears to rotate in the same direction and at the same speed during their normal operation, without relative movement between the shaft and the gears except when the angular relation of the gears is changed for the purpose of changing the phase relation of the cams.

My invention is not limited to the use of helical gear wheels as herein shown, since helical segments or racks provided with angularly disposed teeth for intermeshing engagement with the helical pinions may be substituted for the helical gear wheels. Other modifications may also be resorted to within the scope of the appended claims.

I claim as my invention:

1. Phase changing gearing comprising two axially aligned spiral gears each adapted to rotate one of two members whose phase relation is to be changed, an intermediate pinion unit comprising two axially aligned spiral pinions adapted to mesh with the spiral gears for rotating said gears in the same direction, and means for moving the pinions along their axis of rotation for changing the angular relation of said gears.

2. Phase changing gearing comprising a shaft adapted to carry a pair of rotatable members, whose phase relation is to be changed, a spiral gear on one of said members, a spiral gear mounted on the other member, an intermediate pinion unit comprising two aligned pinions for driving said gears, and means for adjusting said pinions along their axis of rotation for changing the angular relation of the rotatable members.

3. Phase-changing gearing comprising two alined helical gears, each adapted for connection to one of the members whose phase relation is to be changed, and each having its teeth angularly disposed with respect to the teeth of the other gear, an intermediate driving unit comprising two helical pinions meshing with said gears, and means for simultaneously and longitudinally shifting said pinions, to change the angular relation of the intermeshing gears.

4. Phase-changing gearing comprising two alined helical gears each having its teeth extending angularly with respect to the teeth of the other gear, a shaft rigidly carrying one of said gears and loosely carrying the other gear, two helical pinions mounted to rotate in unison and each meshing with one of said helical gears, and means for simultaneously and longitudinally shifting said pinions, to change the angular relation of the intermeshing gears.

5. In combination, a pair of rotatable operating members, a helical gear mounted for rotation with each of said members, the teeth of one of said gears being angularly disposed with respect to the teeth of the other gear, means for driving one of said gears, a pair of helical pinions mounted for rotation in unison and each meshing with one of said helical gears to transmit the rotation of one helical gear to the other, and means for adjusting said pinions in an axial direction to produce relative angular displacement of said helical gears and of said operating members.

6. In combination, a pair of rotatable operating members, a helical gear mounted for rotation with each of said members, the teeth of one of said gears being angularly disposed with respect to the teeth of the other gear, means for driving one of said gears, a pair of helical pinions mounted for rotation in unison and each meshing with one of said helical gears to transmit the rotation of one helical gear to the other, and means, operable while said gears are rotating, for moving said pinions in an axial direction.

7. In combination, a pair of operating devices, a toothed driving member operatively connected to each of said devices, the teeth of each member being angularly disposed with respect to the teeth of the other member, means for moving one of said driving members, a pair of elements each having intermeshing engagement with one of said driving members, and means for adjusting said elements in a direction transverse to the direction of movement of said driving members to shift one of said members relative to the other and to thereby change the time cycle of operation of one of the said operating devices relative to the other.

8. In combination, a pair of operating members, a helical gear mounted for rotation with each of said members, the said members and gears being in axial alignment with one another and the teeth of said gears being angularly disposed with respect to each other, means for driving one of said gears, a pair of helical pinions mounted in axial alignment parallel with the axis of said helical gears and adapted to be rotated in unison, each of said pinions meshing with one of said helical gears to transmit the rotation of one helical gear to the other, means for adjusting said pinions in an axial direction to shift one of said helical gears angularly relative to the other and to thereby advance one of the operating members relative to the other, and a shaft extending axially through both of said helical gears.

9. In combination, a pair of operating members, a helical gear connected to drive each of said members, the teeth of said gears being disposed at opposite angles with respect to each other, a pair of helical pinions mounted for rotation in unison and each meshing with one of said helical gears, and means for adjusting said pinions in an axial direction to shift one of said helical gears angularly relative to the other and to thereby advance one of the operating members relative to the other.

10. The combination with a pair of rotatable operating members, a pair of helical gears each mounted for rotation with one of said members, the teeth of said gears being disposed at opposite angles with respect to each other, means for driving one of said gears, a pair of helical pinions mounted for rotation in unison and each meshing with one of said helical gears to cause the rotation of the said driven helical gear to drive the other in the same direction and at the same speed, a shaft extending through, and rotating in unison with, both of said helical gears, and means for moving the said helical pinions in an axial direction while said gears are rotating, thereby changing the angular relation of said helical gears and of said actuating members.

11. In combination, a pair of coaxially mounted rotatable cams, a pair of helical gears each having its teeth angularly disposed with respect to the teeth of the other gear between said cams and coaxially therewith and each of said gears being connected to rotate one of said cams, a shaft extending through all of said cams and gears, a second shaft mounted parallel to said first-named shaft, helical pinions carried by said second shaft and meshing with said helical gears, and means for shifting said second shaft longitudinally.

12. In combination, a pair of coaxially mounted rotatable cams, a pair of helical gears, each connected to rotate one of said cams and each having its teeth angularly disposed with respect to the teeth of the other gear, the said gears being mounted between said cams and coaxially therewith, a shaft extending through all of said cams and gears, a second shaft mounted parallel to said first-named shaft, helical pinions carried by said second shaft and meshing with said helical gears, and means for shifting said second shaft longitudinally.

13. A device of the character described comprising a driving gear, a driven gear running in mesh with the driving gear, said gears having parallel axes, and adjusting means including a screw threaded adjusting member having a swivel connection with one of said gears and mounted for movement by the action of its screw threads to shift the gear having said swivel connection therewith axially with respect to the other gear, the intermeshing surfaces of said gears being so formed that said axial shifting of the gear will circumferentially advance or retard a given point on the periphery of one gear with respect to a corresponding point on the periphery of the other gear.

14. The combination of a helical driving gear and a helical driven gear running in mesh with each other and rotatable about parallel axes, a movable anti-friction device supporting one end of the driving gear, and means for adjusting said anti-friction device and the driving gear as a unit axially of said driving gear to change the angular relation of said gears.

15. The combination of a helical driving gear and a helical driven gear running in mesh with each other, an anti-friction device connected with one end of the driving gear, and a mounting supporting said anti-friction device and said driving gear for movement as a unit axially of the driving gear, whereby the angular relation of said gears may be changed, said mounting and said anti-friction device having co-engaging screw threads.

16. In combination, a pair of axially aligned independently rotatable members, means for driving one of said members, and means for transmitting motion from said driven rotatable member to the second rotatable member, said motion transmitting means including a helical gear carried by said second rotatable member and a helical pinion in mesh with said helical gear, said helical pinion being movable axially independently of the helical gear while in mesh therewith to change the phase relation between said first named rotatable members, and driving means between said driven rotatable member and said helical pinion.

Signed at Hartford, Connecticut, this 20th day of March, 1925.

EDWARD H. LORENZ.